United States Patent
Lin et al.

(10) Patent No.: US 10,845,475 B2
(45) Date of Patent: Nov. 24, 2020

(54) METHOD OF MEASURING AZIMUTH OF RADAR TARGET

(71) Applicant: National Chung Shan Institute of Science and Technology, Taoyuan (TW)

(72) Inventors: Chun-Jung Lin, Taoyuan (TW); Liang-Yu Ou Yang, Taoyuan (TW); Po-Yao Huang, Taoyuan (TW); Chi-Ming Hsieh, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 234 days.

(21) Appl. No.: 16/049,413

(22) Filed: Jul. 30, 2018

(65) Prior Publication Data

US 2020/0033467 A1    Jan. 30, 2020

(51) Int. Cl.
*G01S 13/58* (2006.01)
*G01S 7/288* (2006.01)
*G01S 13/06* (2006.01)

(52) U.S. Cl.
CPC ............ *G01S 13/581* (2013.01); *G01S 7/288* (2013.01); *G01S 13/06* (2013.01); *G01S 2007/2883* (2013.01)

(58) Field of Classification Search
CPC ...... G01S 13/42; G01S 13/422; G01S 13/426; G01S 13/428; G01S 13/4418; G01S 13/4427; G01S 13/581; G01S 13/583; G01S 7/412; G01S 2007/2883
See application file for complete search history.

(56) References Cited

U.S. PATENT DOCUMENTS

| | | | | |
|---|---|---|---|---|
| 5,302,956 A | * | 4/1994 | Asbury | G01S 13/325 342/70 |
| 2003/0174088 A1 | * | 9/2003 | Dizaji | G01S 13/30 342/93 |
| 2010/0271254 A1 | * | 10/2010 | Kanamoto | G01S 13/931 342/27 |
| 2012/0194379 A1 | * | 8/2012 | Kurono | G01S 13/42 342/147 |
| 2014/0062763 A1 | * | 3/2014 | Kishigami | G01S 3/74 342/158 |
| 2016/0154099 A1 | * | 6/2016 | Saito | G01S 7/412 342/28 |
| 2018/0074161 A1 | * | 3/2018 | Rosenbaum | G01S 13/762 |

* cited by examiner

*Primary Examiner* — Peter M Bythrow
(74) *Attorney, Agent, or Firm* — Chun-Ming Shih; LanWay IPR Services

(57) ABSTRACT

A method of measuring an azimuth of a target by a scanning radar includes (a) establishing a radar scanning model, including (a1) selecting an antenna pattern, (a2) setting a set of radar parameters, (a3) creating reflected signals simulation curve, (a4) sampling the reflected signals simulation curve to create a plurality of sets of simulation data, each set is consisted of successive samples, and (a5) normalizing each sample of each set of simulation data to create a plurality sets of records of normalized simulation data; (b) obtaining normalized scanning data; (c) comparing records of normalized simulation data with the normalized scanning data; and (d) obtaining an azimuth of the target.

4 Claims, 4 Drawing Sheets

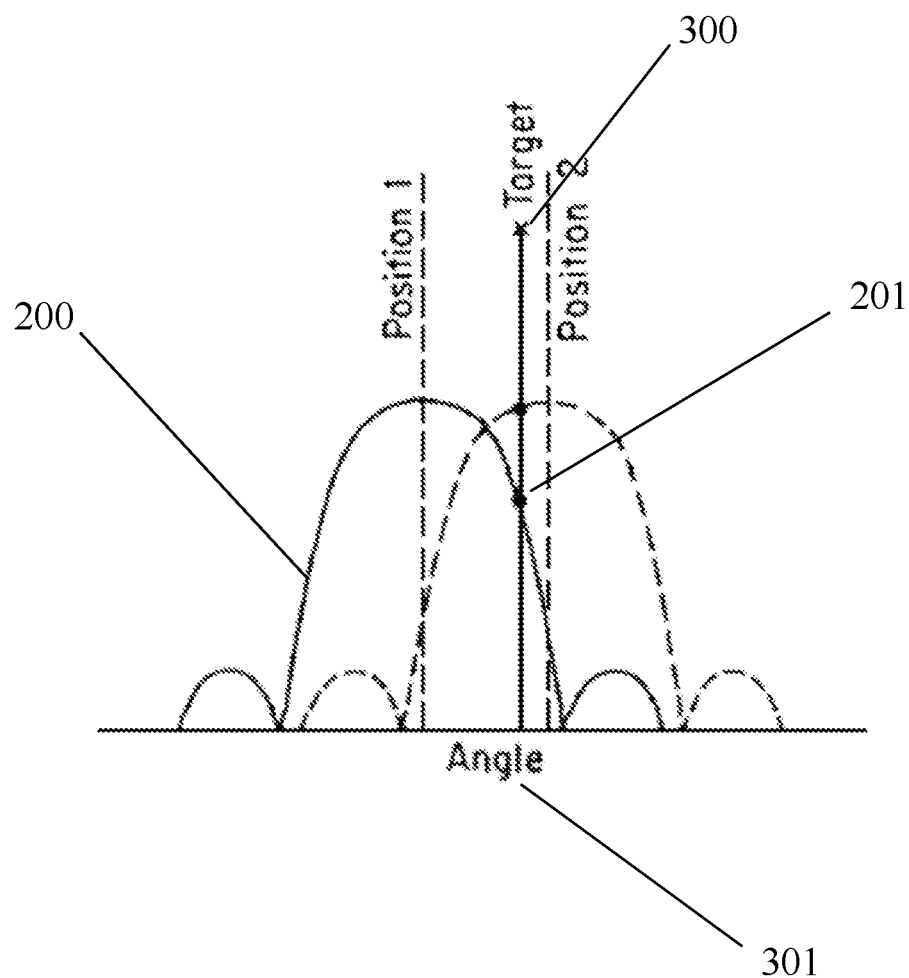
【Fig. 1】

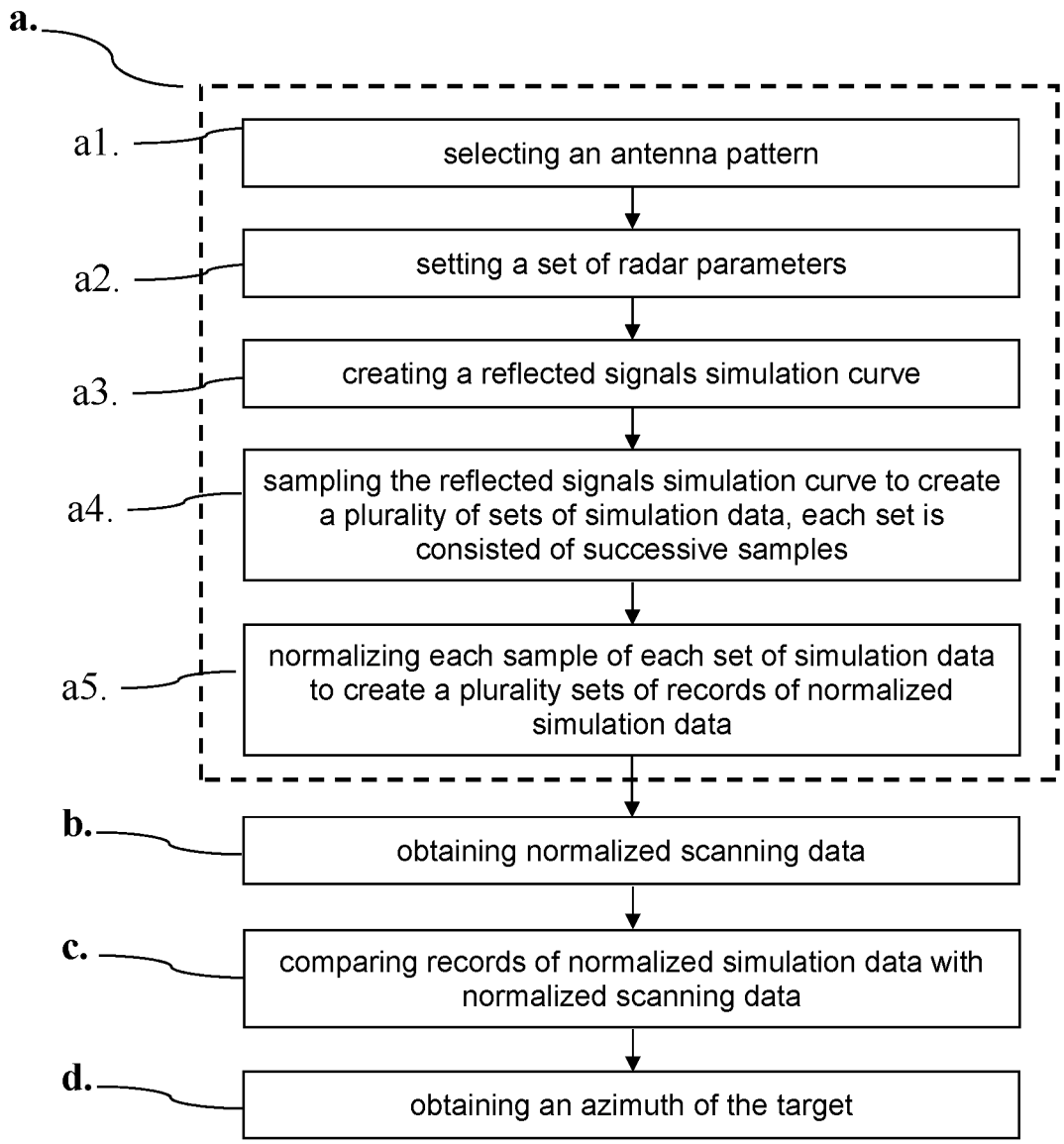
[Fig. 2]

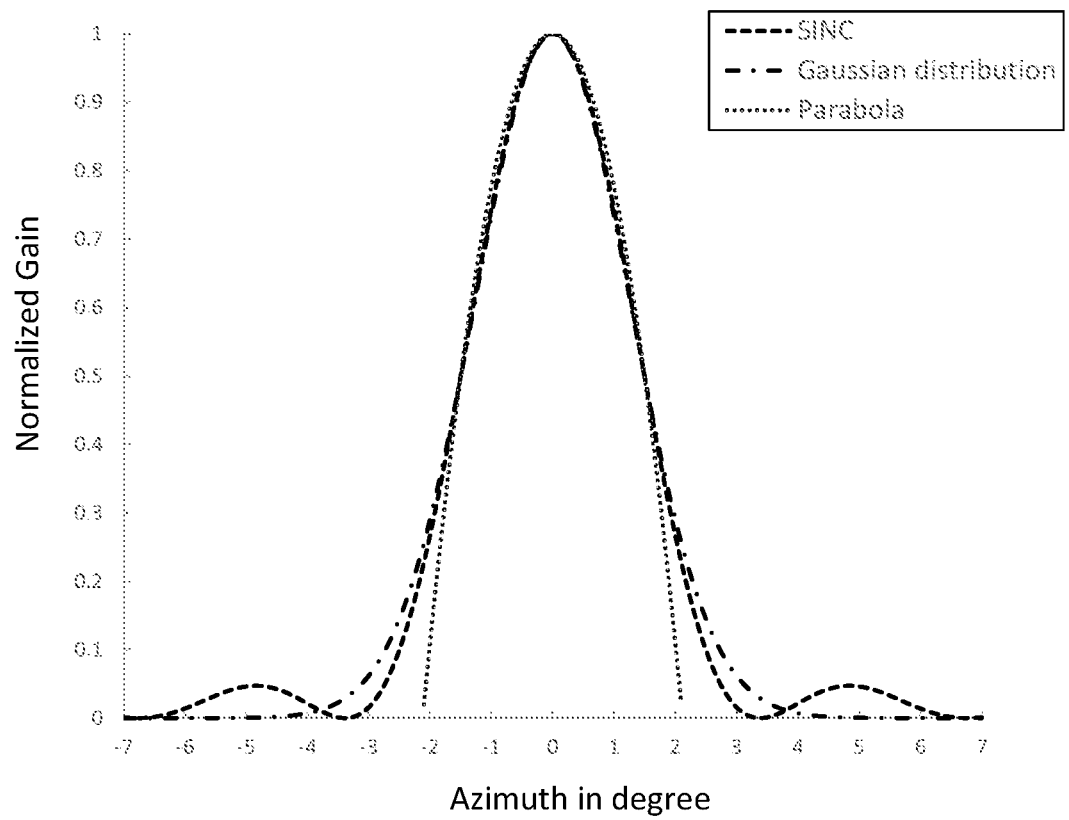
【Fig. 3】

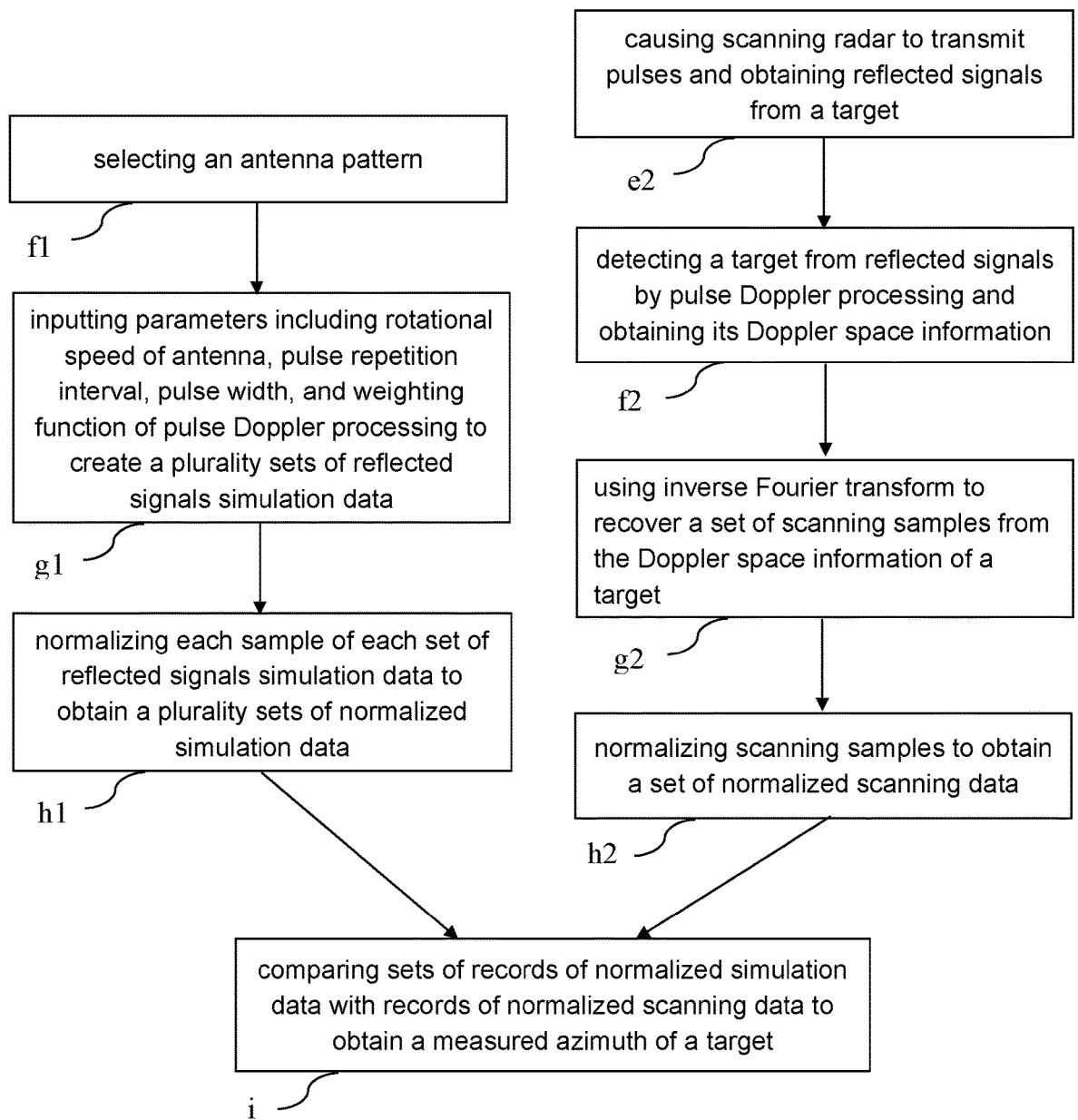
[Fig. 4]

METHOD OF MEASURING AZIMUTH OF RADAR TARGET

BACKGROUND OF THE INVENTION

1. Technical Field

The technical field relates to radar target detection, and more particularly relates to a method of measuring an azimuth of a target by a scanning pulse-Doppler radar.

2. Description of Related Art

Radar (RAdio Detection And Ranging) is an object-detection system that uses radio waves to determine the range, angle, or velocity of objects. It can be used to detect aircraft, ships, motor vehicles, and weather formations.

A pulse-Doppler radar is a specialized radar that uses the Doppler effect to produce velocity data about objects at a distance. It does this by bouncing a microwave signal off a desired target and analyzing how the object's motion has altered the frequency of the returned signal. This variation gives direct and highly accurate measurements of the radial component of a target's velocity relative to the radar. Further, pulse-Doppler radars are characterized by high capability of mitigating interference and thus, they are used in aviation, etc.

Different from monopulse radar systems, a conventional rotational radar has antenna capable of rotating to radiate a beam for detecting a target. For measuring an azimuth of a single target, two distinct, stable and successive reflected signals are required for azimuth measurement. Signal-to-noise (SNR) of some reflected signals is too small to be identified or radar cross section (RCS) of a target fluctuates due to both the movement of the target itself and the radar aspect angle. Thus, the method implemented by the conventional rotational radar does not have high precision. While pulse-Doppler radars are characterized by high capability of mitigating interference, they suffer the same problems.

Thus, the need for improvement still exists.

SUMMARY OF THE INVENTION

The disclosure is directed to a method of measuring an azimuth of a target by a scanning radar for eliminating drawbacks including those associated with the conventional art.

It is therefore one object of the invention to provide a method of measuring an azimuth of a target by a scanning radar, comprising (a) establishing a radar scanning model, comprising the sub-steps of (a1) selecting an antenna pattern, (a2) setting a set of radar parameters, (a3) creating reflected signals simulation curve, (a4) sampling the reflected signals simulation curve to create a plurality of sets of simulation data, each set is consisted of successive samples, and (a5) normalizing each samples of each set of simulation data to create a plurality sets of records of normalized simulation data; (b) obtaining normalized scanning data; (c) comparing the plurality of records of normalized simulation data with the normalized scanning data; and (d) obtaining an azimuth of the target.

The above and other objects, features and advantages of the invention will become apparent from the following detailed description taken with the accompanying drawings.

BRIEF DESCRIPTION OF THE DRAWINGS

FIG. 1 is an antenna pattern depicting a method of measuring an azimuth of a target of a radar according to a first preferred embodiment of the invention;

FIG. 2 is a flowchart of a method of measuring an azimuth of a target of a radar according to a first preferred embodiment of the invention;

FIG. 3 is an approximation of antenna pattern depicting curve selection according to the method of the first preferred embodiment of the invention; and FIG. 4 is a flowchart of a method of measuring an azimuth of a target of a radar according to a second preferred embodiment of the invention.

DETAILED DESCRIPTION OF THE INVENTION

Embodiments of the invention will now be described, by way of example only, with reference to the accompanying drawings.

Referring to FIG. 1, FIG. 1 is an antenna pattern depicting a method of measuring an azimuth of a target of a radar according to a first preferred embodiment of the invention and is discussed in detail below.

In the embodiment, a transmitter of a radar (e.g., scanning radar) emits a set of the scanning signal consisted of the plurality of coherent pulses. Because of the two-way beam shape losses 200, the radar signals reflect off a target 300 and returns to a receiver of the radar as reflected signals 201. The reflected signals 201 are used to measure an azimuth 301 of the target 300. Specifically, the method comprises the following steps: In step (b1), a transmitter of a radar emits a set of scanning signal consisted of the plurality of coherent pulses. In step (b2), the radar signals reflect off a target 300 and returns to a receiver of the radar as reflected signals 201. In step (b3), detecting a target from the reflected signals 201 by pulse-Doppler processing and obtaining its Doppler space information. Moreover, pulse-Doppler processing comprises weighting window technique, time-frequency transform, and target detection. In step (b4), inverse Fourier transform is used to recover the scanning samples from the Doppler space information of the target. In step (b5), normalization is performed on the scanning samples to obtain normalized scanning data.

Referring to FIG. 2, FIG. 2 is a flowchart of a method of measuring an azimuth of a target of a radar according to a first preferred embodiment of the invention. As illustrated in FIG. 2, the method of measuring an azimuth of a target of a radar comprises the step (a) of establishing a radar scanning model. The step (a) comprises the sub-steps of (a1) selecting an antenna pattern, (a2) setting a set of radar parameters, (a3) creating a reflected signals simulation curve 200, (a4) sampling the reflected signals simulation curve to create a plurality of sets of simulation data, each set is consisted of successive samples, and (a5) normalizing each sample of each set of simulation data to create a plurality sets of records of normalized simulation data.

The method of measuring an azimuth of a target of a radar further comprises the steps of (b): obtaining normalized scanning data, (c): comparing the plurality of records of normalized simulation data with the normalized scanning data, and (d): obtaining an azimuth of the target.

Referring to FIGS. 2 and 3 in which FIG. 2 is a flowchart of a method of measuring an azimuth of a target of a radar according to a first preferred embodiment of the invention, and FIG. 3 is an approximation of antenna pattern depicting curve selection according to the method of the first preferred embodiment of the invention.

As illustrated in FIG. 2, the method of measuring an azimuth of a target of a radar comprises the following steps: In step (a), a radar scanning model is established. The step (a) comprises the sub-step of (a1) selecting an approximation antenna pattern such as a near antenna pattern of Gauss distribution in the embodiment. In other embodiments, the antenna pattern is selected from one of an antenna pattern obtained from microwave chamber measurement, an ideal antenna pattern simulated by sinc function, and a parabolic approximation to 3 dB antenna pattern. The step (a) further comprises the sub-step of (a2) setting a set of radar parameters consisted of rotational speed of antenna as a scanning rate of a scanning radar and setting a weighting function for reducing the gain of the side-lobe from adjacent filter bank. The commonly used weighting functions are Uniform weighting, Hamming window, Hanning window, or Chebyshev window. The step (a) further comprises the sub-step of (a3) creating reflected signals simulation curve 200 which is obtained from the reflected scanning signals of the scanning radar reflected from the ideal target 300. The step (a) further comprises the sub-step of (a4) sampling the reflected signals simulation curve to create a plurality of sets of simulation samples. The step (a) further comprises the final sub-step of (a5) normalizing each simulation sample to create a plurality of records of normalized simulation data.

In a preferred embodiment, the number of the records of the normalized simulation data is M which is a selected integer based on a system condition. Specifically, M is a variable based on processing performance of a radar data processor, parameters of a scanning radar, and required precision for measuring an azimuth.

Preferably, between sub-steps (a2) and (a3), the step (a) further comprises the sub-step of setting a set of radar parameters. Specifically, the radar parameter is a pulse repetition interval, a rotational speed of antenna, or a combination thereof. Thus, the antenna pattern is selected, radar parameters are inputted to create the reflected signals simulation curve.

In an embodiment, each set of the normalized simulation data or the records of the normalized scanning data comprise a plurality of records of data and the number of the records of data is N which is a power of 2 such as 16, 32, 64, 128, 256, etc. N is the number of samples performed in Fourier transform or inverse Fourier transform, furthermore N is the number of a set of coherent pulses reflected from a target. In an embodiment, a distance of the target to the radar is greater than a distance that a pulse repetition interval covered. And in turn, the number of the detected pulses from a target is less than N. Further, the number of the detected pulses from a target is used to adjust the amount of normalized simulation data and the number of the records of normalized scanning data. In a preferred embodiment, after evaluating processing performance of a radar data processor, parameters of the scanning radar, and required precision of measuring an azimuth into consideration, M has an optimum of $$\left\lceil \frac{2\theta}{T\omega} \right\rceil - N,$$

where $\theta$ is 3 dB beam width, $\omega$ is a rotational speed of the antenna, and T is a pulse repetition interval.

After the plurality of sets of the normalized simulation data and the records of the normalized scanning data have been obtained, the records of the normalized simulation data are compared with the records of the normalized scanning data so as to obtain a measured azimuth in which each of the M records of the normalized simulation data is compared with each record of the normalized scanning data. Specifically, the M records of the normalized simulation data are some of the M overlapping segments subjected to normalization of the reflected signals simulation curve. In an embodiment, the comparison includes performing a dot product on each of the normalized simulation data with the normalized scanning data and finding the simulation data which has the maximum value of the dot products. The angle corresponding to the maximum value of the normalized simulation data is defined as an azimuth 301 of the target 300. In another embodiment, the comparison includes performing a vector subtraction on each of the normalized simulation data with the normalized scanning data and finding the simulation data which has the minimum norm after the vector subtractions. The angle corresponding to the minimum norm of the normalized simulation data is defined as an azimuth 301 of the target 300.

The sampling step (a4) and normalizing step (a5) are further discussed below. For example, in step (a4), sampling the reflected signals simulation curve to create a plurality of (e.g., n, $\{a_i | i=1, \ldots, n\}$) simulation samples. Next, four records of data (i.e., N=4) are grouped as a set and thus there are n−N+1 sets (i.e., M=n−N+1) of simulation samples: ($S_1$, $S_2$, $S_3$, $S_4$), ($S_2$, $S_3$, $S_4$, $S_5$), . . . ($S_{n-3}$, $S_{n-2}$, $S_{n-1}$, $S_n$). A weighting operation is performed on the plurality of simulation samples based on the weighting function ($W_1$, $W_2$, $W_3$, $W_4$) set in step (a2). Thus, M sets of weighted simulation samples ($S_1W_1$, $S_2W_2$, $S_3W_3$, $S_4W_4$), ($S_2W_1$, $S_3W_2$, $S_4W_3$, $S_5W_4$), . . . , ($S_{n-3}W_1$, $S_{n-2}W_2$, $S_{n-1}W_3$, $S_nW_4$) are obtained. And in turn, each of the M sets of weighted simulation samples are normalized. As a result, M sets of normalized simulation data are obtained.

Preferably, the reflected signals 201 are caused by the pulses of the same coherent processing interval reflected from a target after the pulses emitted by the scanning radar. This is an improvement in comparison with the conventional art which requires a plurality of coherent processing intervals in a scanning prior to measuring an azimuth of the target.

Referring to FIG. 4 in conjunction with FIG. 1, FIG. 4 is a method of measuring an azimuth of a target of a radar according to a second preferred embodiment of the invention. As illustrated in FIG. 4, in step (f1) an antenna pattern is selected prior to establishing a radar scanning model. Next in step (g1), parameters such as the rotational speed of antenna, the pulse repetition interval, the pulse width, and the weighting function are inputted to create M sets of reflected signals simulation data in which a set of the reflected signals simulation data has N records of data. In step (h1), each set of the reflected signals simulation data is normalized to obtain M sets of normalized simulation data each having N records of data. Concurrently, in step (e2), the scanning radar emits a plurality of pulses in a coherent processing interval and reflected signals from a target 201 due to the emission are obtained. A scanning azimuth is obtained from the encoder of the scanning radar. In step (f2), the reflected signals 201 is processed by pulse-Doppler processing unit to obtain the Doppler information of a target. In step (g2), inverse Fourier transform is used to recover a set of scanning samples from the Doppler space information. In step (h2), the scanning samples are normalized to obtain N records of normalized scanning data. Finally, in step (i), the M sets of N records of normalized simulation data are compared with N records of normalized scanning data to obtain a measured azimuth which is taken as an azimuth 301 of the target 300.

It is envisaged by the method of measuring an azimuth of a target of a radar of the invention that only one coherent processing interval of scanning for measuring an azimuth of a target is required. The precision of azimuth of a moving target would be enhanced and the interference from background clutter could be mitigated from being compromised by noise interference of the reflected signals. A precise measurement of an azimuth of a target can be obtained by using minimum radar resources and system resources.

While the invention has been described in terms of preferred embodiments, those skilled in the art will recognize that the invention can be practiced with modifications within the spirit and scope of the appended claims.

What is claimed is:

1. A method of measuring an azimuth of a target by a scanning radar, comprising the steps of:
    (a) establishing a radar scanning model, comprising the sub-steps of (a1) selecting an antenna pattern, (a2) setting a set of radar parameters, (a3) creating a reflected signals simulation curve, (a4) sampling reflected signals to create a plurality of simulation data, wherein each set of simulation data consists of successive samples, and (a5) normalizing each of the successive samples of each set of simulation data to create a plurality sets of records of normalized simulation data;
    (b) obtaining normalized scanning data;
    (c) comparing records of normalized simulation data with the normalized scanning data; and
    (d) obtaining an azimuth of the target,
    wherein a number of the records of the normalized simulation data is M which is a selected integer;
    wherein each of the records of the normalized simulation data or each of records of the normalized scanning data comprise a plurality of records of data, and the number of the records of data is less than or equal to N which is a power of 2;
    wherein the M is an optimum value calculated according to a formula:

$$\left\lceil \frac{2\theta}{T\omega} \right\rceil - N,$$

where $\theta$ is a half power beam width, w is a rotational speed of antenna, and T is a pulse repetition interval;
    wherein step (b) comprises the sub-steps of:
        (b1) emitting a set of scanning signal consisted of a plurality of coherent pulses by the scanning radar;
        (b2) obtaining a plurality of reflected signals from a target;
        (b3) detecting the target from the reflected signals by a pulse Doppler process, and obtaining a Doppler space information of the target;
        (b4) using inverse Fourier transform to recover scanning samples from the Doppler space information of the target; and
        (b5) normalizing the scanning samples to obtain normalized scanning data,
    wherein the step (c) comprises performing a dot product on each of the normalized simulation data with the normalized scanning data and finding the simulation data which has the maximum value of the dot products, and
    wherein the step (c) comprises performing a vector subtraction on each of the normalized simulation data with the normalized scanning data, and finding the simulation data which has the minimum norm after the vector subtractions.

2. The method as claimed in claim 1, wherein the reflected signals are caused by a set of coherent pulses reflected from the target, and the set of coherent pulses is emitted by the scanning radar in a coherent processing interval during the scanning.

3. The method as claimed in claim 1, wherein the radar parameters comprising a rotational speed of antenna, a pulse repetition interval and a weighting function.

4. The method as claimed in claim 3, wherein between sub-steps (a4) and (a5), step (a) further comprises the sub-step of multiplying each simulation data by the weighting function.

* * * * *